(12) United States Patent
Oh et al.

(10) Patent No.: US 12,038,414 B2
(45) Date of Patent: Jul. 16, 2024

(54) METHOD OF PREDICTING LIFESPAN OF MATERIAL

(71) Applicants: Hyundai Motor Company, Seoul (KR); Kia Corporation, Seoul (KR)

(72) Inventors: Kyung Hwan Oh, Seoul (KR); Hyeong Won Park, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 329 days.

(21) Appl. No.: 17/455,754

(22) Filed: Nov. 19, 2021

(65) Prior Publication Data

US 2022/0373441 A1    Nov. 24, 2022

(30) Foreign Application Priority Data

May 24, 2021    (KR) .................. 10-2021-0066406

(51) Int. Cl.
  *G06F 11/30*    (2006.01)
  *G01N 3/02*    (2006.01)
  *G01N 3/18*    (2006.01)
(52) U.S. Cl.
  CPC .............. *G01N 3/02* (2013.01); *G01N 3/18* (2013.01)

(58) Field of Classification Search
  CPC ........................................... G01N 3/02
  See application file for complete search history.

(56) References Cited

FOREIGN PATENT DOCUMENTS

| CN | 104008280 | * | 8/2014 |
| CN | 107982190 | * | 5/2019 |
| KR | 10-2001583 | B1 | 7/2019 |
| KR | 10201927098 | * | 7/2019 |

* cited by examiner

*Primary Examiner* — Phuong Huynh
(74) *Attorney, Agent, or Firm* — Fox Rothschild LLP

(57) ABSTRACT

Disclosed is a method of predicting a lifespan of a material by using a material parameter and by using Equation described below.

$$y = \gamma \times \exp\left[-\left(\frac{x}{\theta}\right)^{\beta}\right]$$

in which y is the physical property retention rate, x is the aging time, θ is a scale parameter, β is a shape parameter, and γ is the material parameter.

4 Claims, 8 Drawing Sheets

ARRHENIUS MODEL PREDICTION STRAIGHT LINE
(BLACK DOTTED ARROW)

METHOD OF PREDICTING LIFESPAN OF MATERIAL

CROSS REFERENCE TO RELATED APPLICATION

The present application claims priority to Korean Patent Application No. 10-2021-0066406, filed May 24, 2021, the entire contents of which is incorporated herein for all purposes by this reference.

TECHNICAL FIELD

The present invention relates to a method of predicting a lifespan of a material in complex aging conditions, the material being used as a material of a component of a vehicle and so on. The method includes using an equation that is a modification of a Weibull distribution (function) equation.

BACKGROUND

A large number of components of a vehicle are manufactured by using a plastic material. Over time, such a component and a material are aged, and a problem in quality may occur when a performance of such a component and a material is degraded below a reference value. In order to minimize the problem in quality, it is important to precisely predict a lifespan of a component and of a material under actual usage conditions, and many models for predicting a lifespan of a material have been proposed.

There are two existing aging models of plastic, such as time-Temperature Superposition (TTS) and Arrhenius model (A model).

TTS is a method of predicting a lifespan by drawing a single curve by moving aging property curves of plastic of each temperature (it may be decided that a lifespan of a material is ended when a physical property retention rate of the material is less than a reference value, so that predicting a physical property is predicting a lifespan.).

Although a standard of moving the aging property curves of plastic of each temperature is referred to as a shift factor, since a standardized method of calculating the shift factor does not exist, there is a disadvantage in that there is a difference in a predicted lifespan for each user.

In addition, it is assumed in TTS that aging of a material depends on a single factor, so that a temperature range available is very narrow. Further, it is difficult to reflect a dispersion and a deviation of a material since a single curve is drawn by moving a plurality of curves in TTS, so that TTS cannot account for a concept related to a reliability.

For Arrhenius model (A model), a linear Arrhenius model and a non-linear Arrhenius model have been used to predict a lifespan by extrapolating an aging of a plastic material over time according to an Arrhenius formula.

In general, the linear Arrhenius model is used since the linear Arrhenius model is relatively precise and easy to use for thermal aging of a plastic, but less precise for an olefin-based plastic and difficult to apply for complex aging excluding the thermal aging.

The non-linear Arrhenius model is a method performed wherein experiments are conducted for each aging mechanism so as to derive an equation and results are summed. The non-linear Arrhenius model has a high accuracy and is applicable in complex aging conditions, but the equation is derived through a lot of experiments and the non-linear Arrhenius model is complicated, so that the non-linear Arrhenius model is inefficient and difficult to use in practice.

As shown in FIGS. 1A and 1B, predicting a thermal aging of nylon is accomplished in a relatively precise manner by using the A model, but it can be seen that predicting a complex aging of nylon has a lot of difference from a measured value.

As described above, existing models have a problem in that it is difficult to predict a lifespan according to a complex aging mechanism, a precise method of predicting a physical property and a lifespan of a plastic material under various vehicle environmental conditions has not been established now, and a method of predicting a lifespan of a component that is formed of a material, beyond a material, has not been proposed as of yet.

The contents described as the related art have been provided only to assist in understanding the background of the present invention and should not be considered as corresponding to the related art known to those having ordinary skill in the art.

SUMMARY OF THE INVENTION

In preferred aspects, provided is a method of precisely predicting a lifespan of a plastic material and a lifespan of a component in actual usage conditions, e.g., in complex environment that is a thermal environment and a chemical environment.

In one aspect, provided is a method of predicting a lifespan of a material, which may include: aging a specimen of the material by immersing the specimen of the material into an immersion solution and heating the immersion solution; measuring a physical property retention rate relative to an initial physical property of the specimen of the material of which the aging is completed; and calculating an aging time by substituting the material parameter to Equation 1 that is described below, in which the aging time is when the physical property retention rate of the material becomes equal to or smaller than a reference value.

[Equation 1] is as follows:

$$y = \gamma \times \exp\left[-\left(\frac{x}{\theta}\right)^{\beta}\right]$$

wherein in Equation 1, y is the physical property retention rate, x is the aging time, $\theta$ is a scale parameter, $\beta$ is a shape parameter, and $\gamma$ is the material parameter.

The physical property measured in the measuring of the material parameter may be tensile strength.

The immersion solution may include an antifreeze fluid including any one of propylene glycol and ethylene glycol.

The aging of the specimen of the material may include aging the specimen of the material by immersing the specimen of the material into the immersion solution for about 24 hours to 72 hours and heating the immersion solution at a temperature of about 100° C. to 135° C.

According to various exemplary embodiments of the present invention, by using the method of predicting a lifespan of a material, a lifespan of a material used as a material of a component of a vehicle as well as a lifespan of an actual component in complex aging conditions may be precisely predicted, so that there is an effect of helping a quality control of a vehicle and so on, and there is an effect of reducing costs.

BRIEF DESCRIPTION OF THE DRAWINGS

The above and other objectives, features, and other advantages of the present invention will be more clearly under-

Figure 1A:
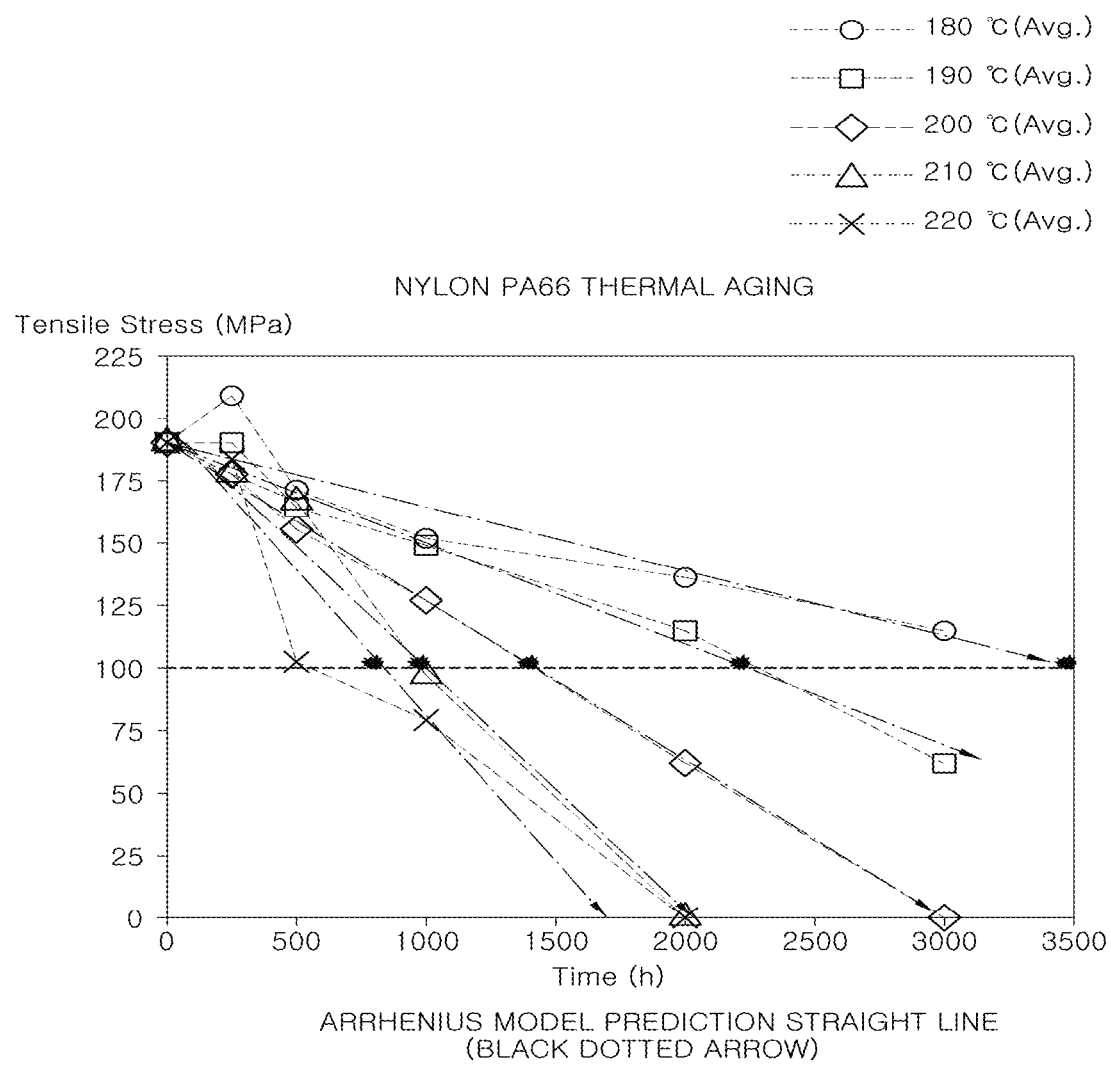
Figure 1B:
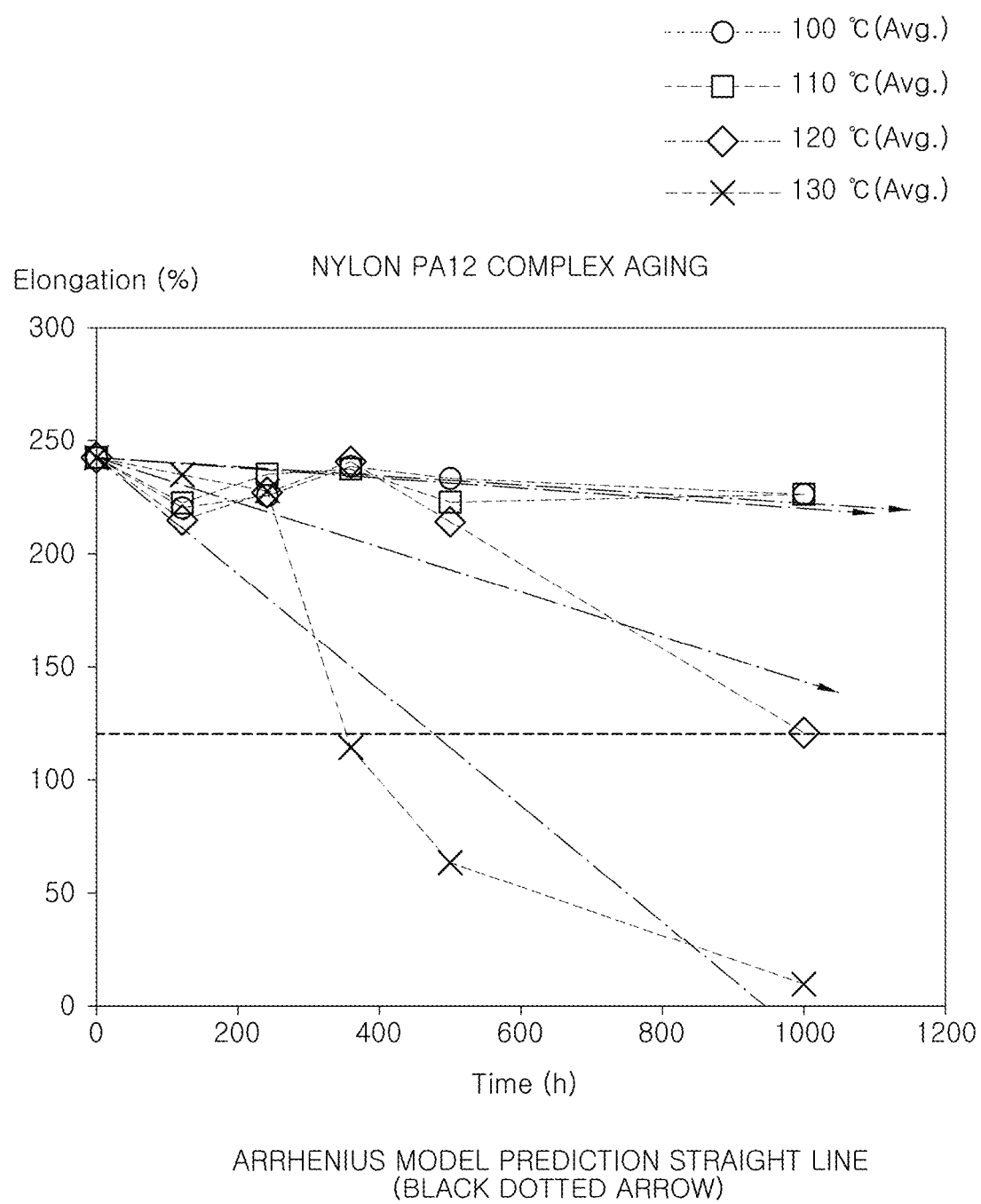
Figure 2:
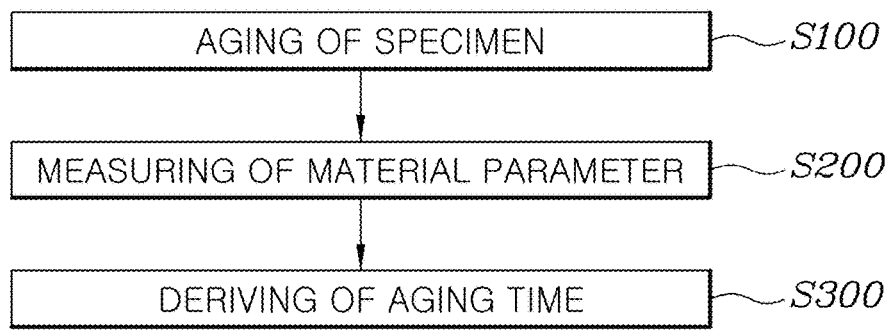

3 stood from the following detailed description when taken in conjunction with the accompanying drawings, in which:

FIG. 1A is a graph illustrating a prediction of a lifespan of a material according to an Arrhenius prediction model under thermal aging conditions;

FIG. 1B is a graph illustrating a prediction of a lifespan of a material according to an Arrhenius prediction model under complex aging conditions; and FIG. 2 is a flowchart illustrating a method of predicting a lifespan of a material according to an exemplary embodiment of the present invention.

Figure 3:
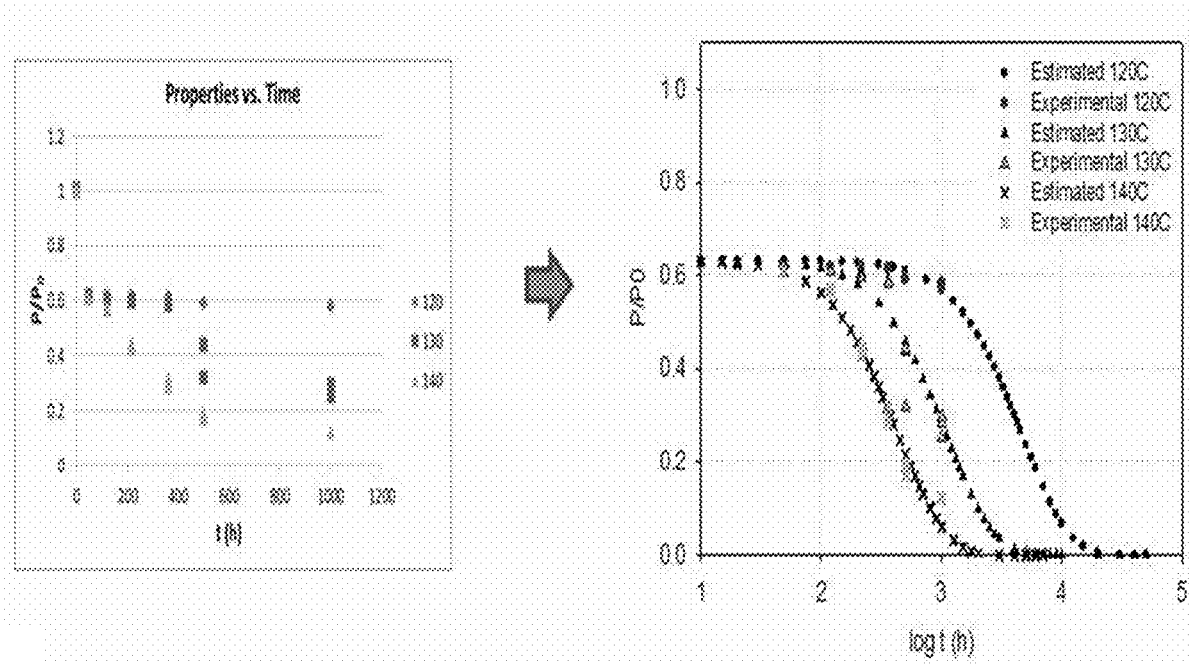

FIG. 3 shows PA66-GF30 Complex Aging Experiment in Experimental Example 1 according to an exemplary embodiment of the present invention.

Figure 4:
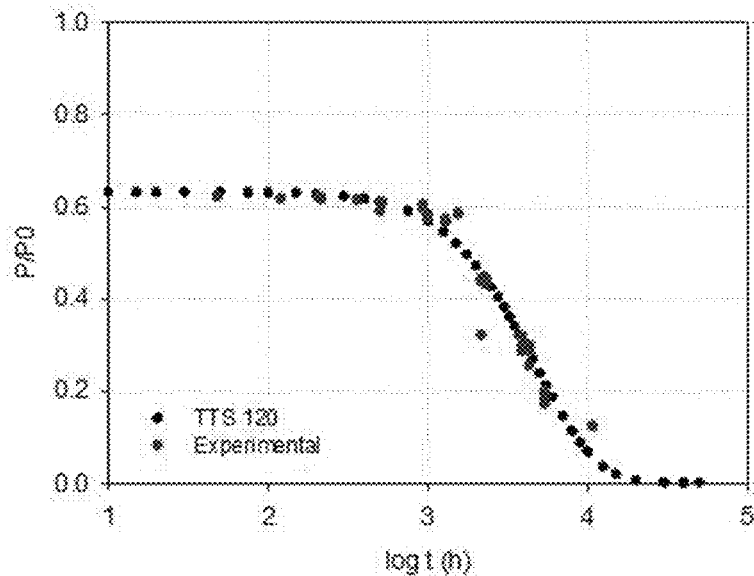

FIG. 4 shows Overlap Graph (grey dot) and Prediction Graph (black dot) in Experimental Example 1 according to an exemplary embodiment of the present invention.

Figure 5:
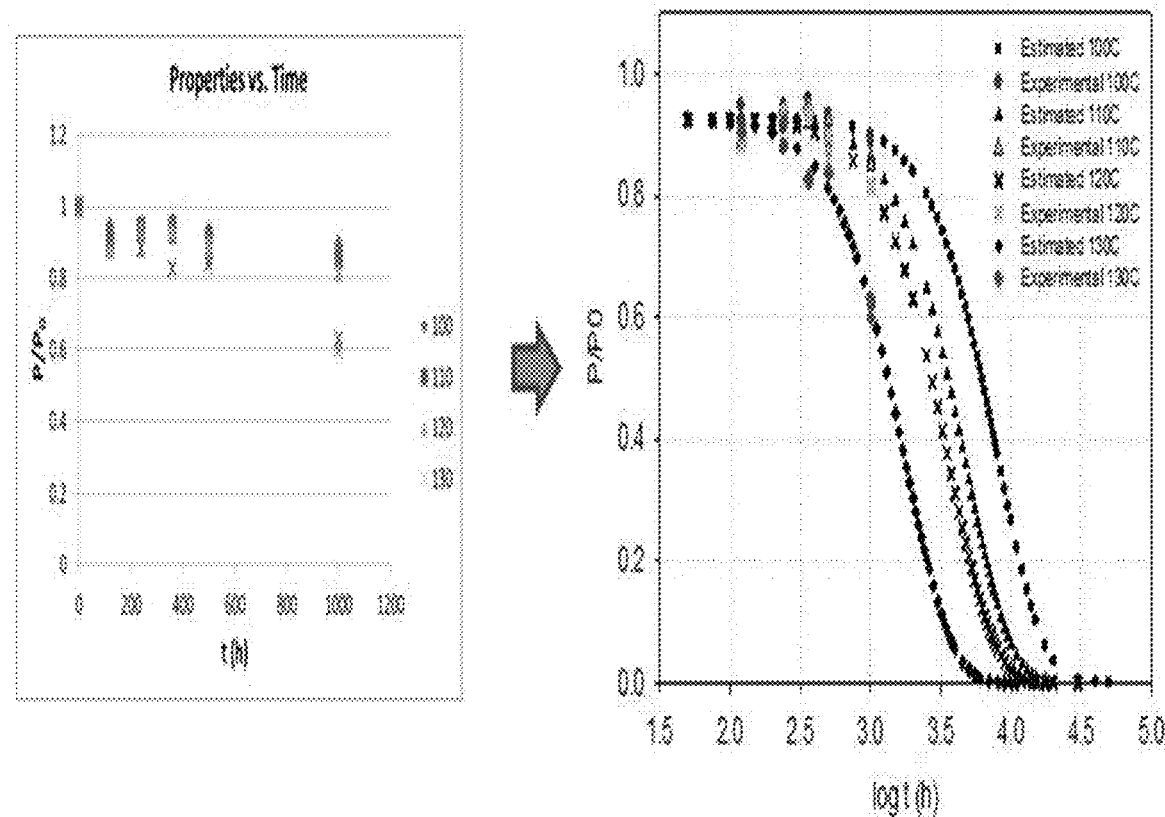

FIG. 5 shows PA12 Complex Aging Experiment in Experimental Example 2 according to an exemplary embodiment of the present invention.

Figure 6:
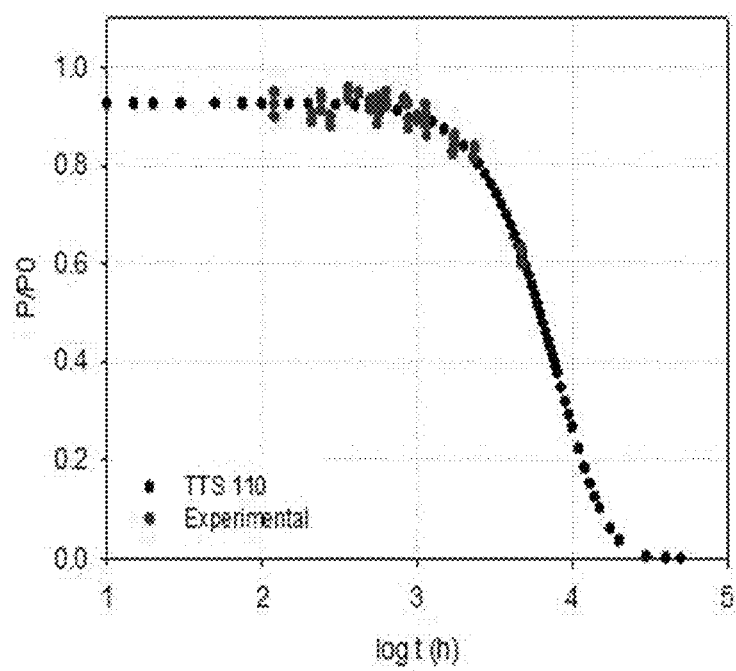

FIG. 6 shows Overlap Graph (grey dot) and Prediction Graph (black dot) in Experimental Example 2 according to an exemplary embodiment of the present invention.

Figure 7:
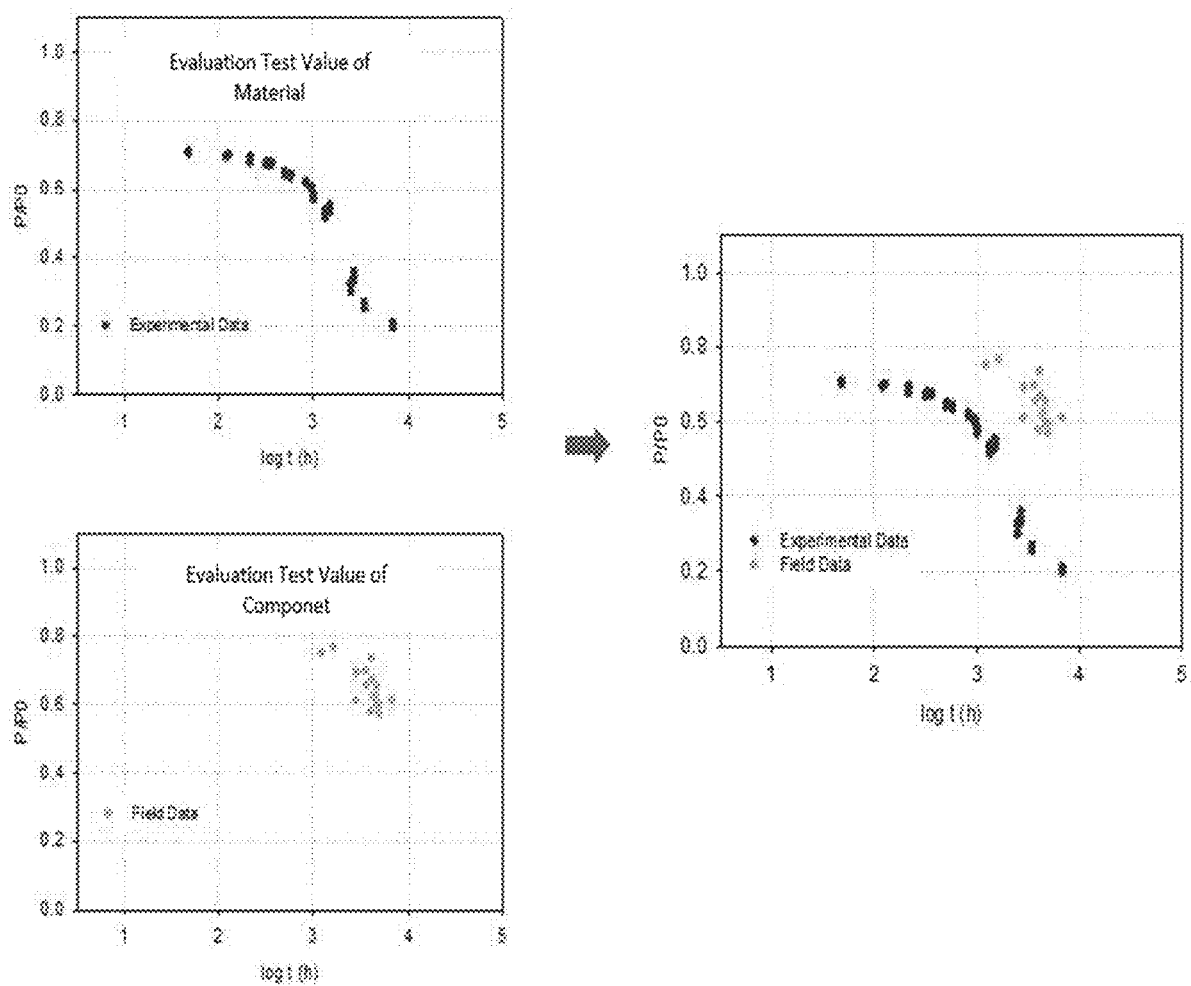

FIG. 7 shows Evaluation Test Values of Material and Component in Experimental Example 3 according to an exemplary embodiment of the present invention.

Figure 8:
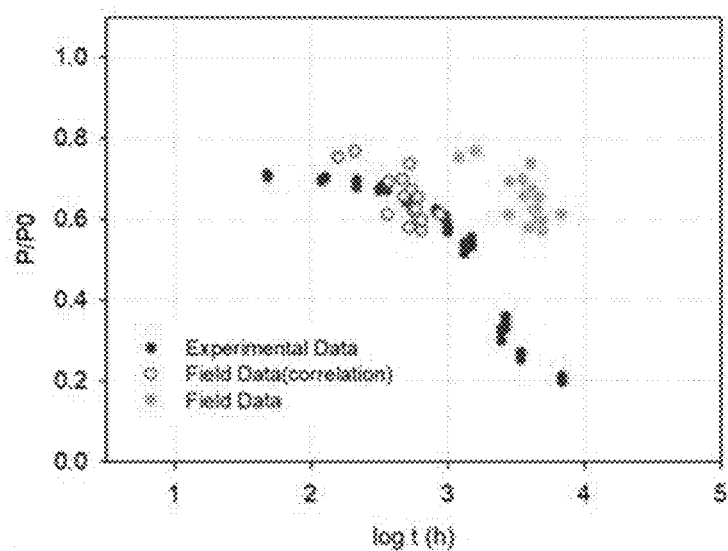

FIG. 8 shows Linkage of Evaluation Test Values of Material and Component in Experimental Example 3 according to an exemplary embodiment of the present invention.

Figure 9:
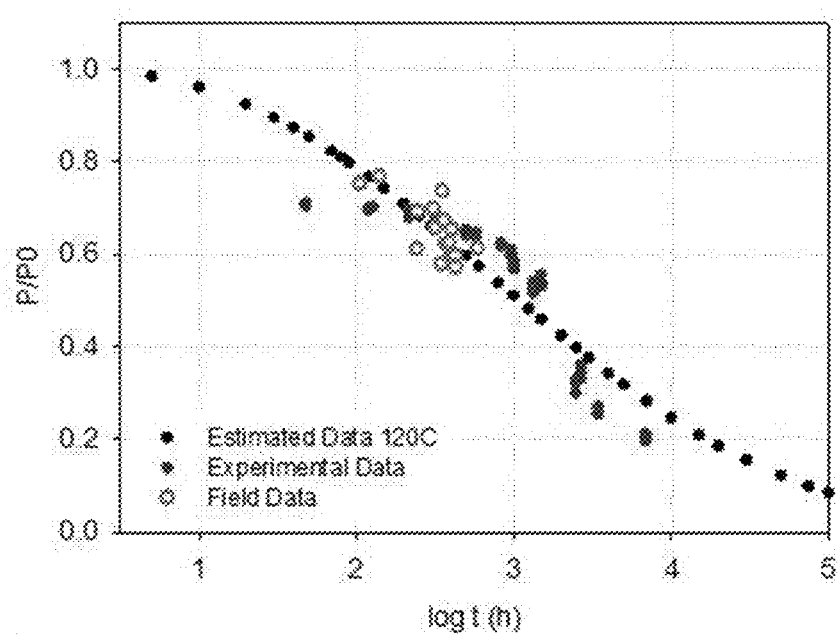

FIG. 9 shows Existing Weibull Survival Function Graph in Experimental Example 3 according to an exemplary embodiment of the present invention.

Figure 10:
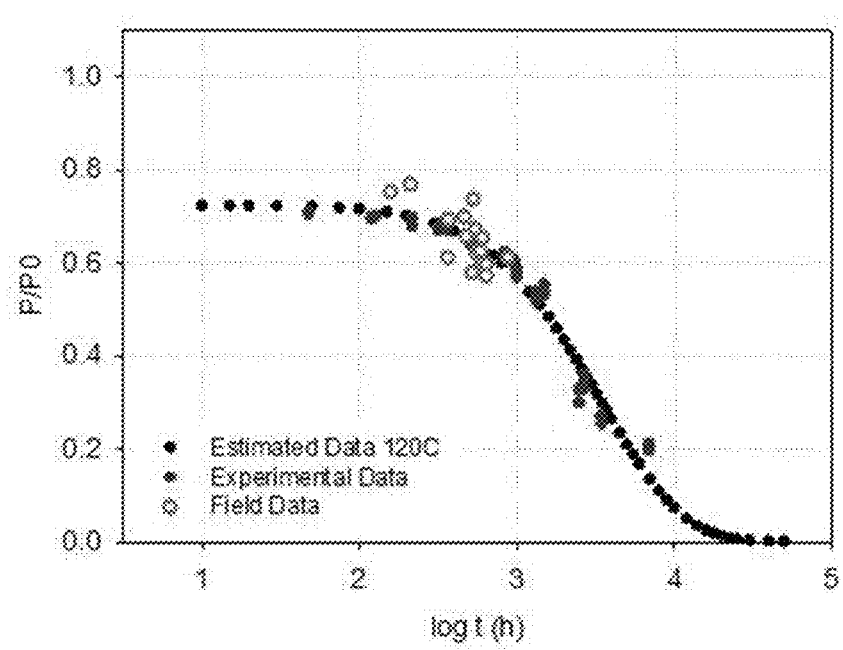

FIG. 10 shows Function Graph with Material Parameter Applied in Experimental Example 3 according to an exemplary embodiment of the present invention.

DETAILED DESCRIPTION OF THE INVENTION

Hereinafter, detailed description of the present invention to solve the above-described problems and to achieve the above-described objectives will be described in detail with reference to the accompanying drawings. When it is determined that the detailed description of the well-known technology known to those skilled in the art may unnecessarily obscure the subject matter of the present invention, the detailed description thereof will be omitted. The present invention may be subjected to various modifications and applications within the scope of the following claims and their equivalents.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In an aspect, provide is a method of predicting a lifespan of a material in complex aging conditions by grafting a material parameter to a Weibull distribution (function), the material parameter being a concept that did not exist before. In addition, the method may predict a lifespan of a component formed of a material.

A method of predicting a lifespan of a material may include: aging a specimen of the material by immersing the specimen of the material into an immersion solution and heating the immersion solution (S100); measuring a physical property retention rate relative to an initial physical property of the specimen of the material of which the aging is completed (S200); and calculating an aging time by substituting the material parameter to Equation 1 that is described below. In Equation 1, the aging time is when the physical property retention rate of the material becomes equal to or smaller than a reference value (S300).

[Equation 1] is as follows:

$$y = \gamma \times \exp\left[-\left(\frac{x}{\theta}\right)^{\beta}\right]$$

wherein y is the physical property retention rate, x is the aging time, $\theta$ is a scale parameter, $\beta$ is a shape parameter, and $\gamma$ is the material parameter.

The material parameter is a constant value that a material has and the material parameter is measured by an experiment, and the material parameter has a value equal to or less than one and equal to or more than zero. The material parameter is a value representing a retention rate of a major physical properties of a material relative to that of the material initially has when after the material is immersed into an immersion solution under high temperature conditions (at a temperature of about 100° C. to 135° C.) for a short period of time (about 24 hours to 72 hours).

The material parameter may be measured through: the aging of the specimen of the material by immersing the specimen of the material into the immersion solution and heating the immersion solution (S100); and the measuring of the material parameter that is defined by measuring the physical property retention rate relative to the initial physical property of the specimen of the material that the aging is completed (S200).

The immersion solution used to measure the material parameter may be an antifreeze fluid that includes any one of propylene glycol and ethylene glycol, but not limited thereto. When selecting the immersion solution, a solution that exists around the material in a condition where the material is mainly placed may be preferably used.

In the present specification, when the experiment is conducted, the materials may be in a condition in which the materials are surrounded by the antifreeze fluid and the antifreeze fluid is selected as the immersion solution.

On the other hand, in measuring the material parameter, a temperature of about 100° C. or greater may be preferably used since a measuring time of the material parameter increases due to a lowered speed of a chemical reaction when the temperature is less than about 100° C. Further, a temperature is greater than about 135° C. may cause exceeding of a boiling point of the antifreeze fluid, and the temperature greater than the boiling point may not be suitable for actual usage conditions and the measuring of the material parameter is not precisely conducted since the antifreeze fluid is evaporated, so that the temperature may be equal to or less than about 135° C.

The temperature is not limited to the above-described temperature, and conditions of the temperature may vary depending on the immersion solution that is used.

In addition, in measuring the material parameter, when the time is less than about 24 hours, a significant measurement error of the material parameter occurs since the immersion solution is not sufficiently permeated inside the specimen of the material. Further, since the aging of the specimen of the material begins when the time is more than 72 hours, an aging physical property rather than a characteristic value of the material is reflected, so that it is preferable that the time may be about 24 hours to 72 hours, or particularly about 48 hours.

In addition, the immersion solution may be an aqueous solution that may have a concentration of about 25% to 75% based on a volume. In a concentration that is less than about 25%, chemical aging may be slow since hydrolysis reaction by water surpasses the chemical aging. Further, in a concentration that is greater than about 75%, chemical equilibrium in a chemical reaction and a uniform distribution toward an inside of the specimen of the material may not occur well since a concentration of chemical substances in the immersion solution is high, so that the material parameter that is measured may be not precise. The most preferable concentration of the immersion solution may be about 50%.

In addition, in measuring the material parameter, a physical property that is measured may be tensile strength. However, the physical property that is measured is not limited thereto, and the material parameter may be obtained by varying the physical property even with the same material since major physical properties of materials are different from each other and a major physical property of a component to which the material is used is different for purpose of the component.

In the present specification, the material parameter may be measured by measuring a retention rate of tensile strength that is an important physical property of materials.

After the measuring of the material parameter (S200), by substituting the measured material parameter to Equation 1, modeling of the material over time relative to the physical property retention rate may be realized.

Equation 1 is as follows.

$$y = \gamma \times \exp\left[-\left(\frac{x}{\theta}\right)^{\beta}\right]$$

wherein y is the physical property retention rate, x is the aging time, $\theta$ is the scale parameter, $\beta$ is the shape parameter, and $\gamma$ is the material parameter.

In particular, by using actual lifespan experimental data of a material and material lifespan prediction data, the scale parameter and the shape parameter are values that may be derived through a linear regression analysis such as a least square method and a maximum likelihood method. The actual lifespan experimental data of a material is a value that already obtained by a manufacturer of a material or is a value that may be obtained by conducting an experiment, and the material lifespan prediction data is a value that may be derived through a time-temperature superposition (TTS) method or an Arrhenius model (A model).

Meanwhile, in the calculating of the aging time (S300), the material parameter, the scale parameter, and the shape parameter are given as a constant number, so that the physical property retention rate (y) according to the aging time (x) or the aging time (x) according to the physical property retention rate (y) may be obtained or calculated.

In particular, the physical property retention rate required for each material may include a value being variable depending on an objective of the material, a usage environment of the material, and the like, so that the aging time that falls below the reference value may be derived by setting the reference value, thereby being capable of predicting the lifespan of the material.

EXAMPLE

Hereinafter, by introducing some of experimental results, it will be demonstrated that the method of predicting a lifespan of a material according to the present invention well matches with the actual experimental results.

The experiment was performed such that a physical property retention rate is measured after a material is immersed into an antifreeze fluid and then the antifreeze fluid is heated. That is, an aging of the material proceeded in complex aging conditions that are thermal aging conditions and chemical aging conditions.

Experimental Example 1: PA66-GF30 Complex Aging

1) An aging experiment was conducted for each temperature (120° C., 130° C., and 140° C.) and for each time (48 hours, 120 hours, 216 hours, 360 hours, 500 hours, and 1000 hours), and tensile strength as a physical property was measured. The experimental result was plotted to a graph as follows (P is a physical property and $P_0$ is an initial physical property). PA66-GF30 Complex Aging Experiment is shown in FIG. 3.

2) By using the experimental values, a graph as shown below was derived, and a lifespan prediction graph was derived on the basis of this graph. The lifespan prediction graph is as follows.

Overlap Graph (Red Dot) and Prediction Graph (Black Dot) is shown in FIG. 4.

3) A shape parameter (β), a scale parameter (θ), and a material parameter (γ) are shown in Table 1.

TABLE 1

| Temperature (° C.) | β | θ | γ |
|---|---|---|---|
| 100 | 13.264 | 3.934 | 0.925 |
| 110 | 12.331 | 3.694 | 0.925 |
| 120 | 11.881 | 3.577 | 0.925 |
| 130 | 10.683 | 3.269 | 0.925 |

Experimental Example 2: PA12 Complex Aging

1) An aging experiment was performed for each temperature (100° C., 110° C., 120° C., and 130° C.) and for each time (120 hours, 240 hours, 360 hours, 500 hours, and 1000 hours), and tensile strength as a physical property was measured. The experimental result was plotted to a graph as follows (P is a physical property and $P_0$ is an initial physical property). PA12 Complex Aging Experiment is shown in FIG. 5.

2) By using the experimental values, a graph as shown below was derived, and a lifespan prediction graph was derived on the basis of this graph. The lifespan prediction graph is shown in FIG. 6.

3) A shape parameter (β), a scale parameter (θ), and a material parameter (γ) in Table 2.

TABLE 2

| Temperature (° C.) | β | θ | γ |
|---|---|---|---|
| 100 | 13.264 | 3.934 | 0.925 |
| 110 | 12.331 | 3.694 | 0.925 |
| 120 | 11.881 | 3.577 | 0.925 |
| 130 | 10.683 | 3.269 | 0.925 |

By the Experimental Example 1 and the Experimental Example 2, it was confirmed that prediction values according to the present invention match well with actual values.

Hereinafter, it will be described that the method of predicting a lifespan of a material is capable of predicting not only a lifespan of a material but also a lifespan of a component formed of a material.

According to the present invention, the method of predicting a lifespan of a material may be utilized in predicting a lifespan of a component, and there is an advantage in that accuracy of the prediction of a lifespan of a component is very high.

Experimental Example 3: Predicting Lifespan of Component

1) By combining evaluation test values of the material and evaluation test values of the component, a graph as follows can be achieved (FIG. 7).

2) By linking the combined graph as shown above to be overlapped as much as possible, a graph as shown below can be achieved (FIG. 8).

3) When an existing Weibull survival function that does not have a material parameter is used, a lifespan prediction graph as shown below can be achieved (FIG. 9).

4) When a function in which a material parameter is applied is used, a lifespan prediction graph as shown below can be achieved (FIG. 10).

5) As a result, when the method of the present invention is applied, experimental values and predicted values are better matched than when the existing model is applied.

According to various exemplary embodiments of the present invention, an aging mechanism that can be applied has no limitation compared to existing aging models, and there is an advantage in that a prediction accuracy is high. As such, the present invention solved a problem in that the existing models have a fixed applicable temperature range or the existing models may be applied only a single aging mechanism and even an accuracy of prediction was not high.

The material parameter, which is a new concept proposed in the present invention, may be achieved quantitatively through an experiment, and a physical property and a lifespan of a material may be predicted by using a simple equation by using the material parameter.

In addition, while many models conventionally used have been applied to predict a lifespan of only a material, a lifespan of a material as well as a lifespan of a component formed of the material may be predicted by using the method of the present invention, and there is an effect in that an accuracy of a prediction result is high when the method of the present invention is applied.

According to various exemplary embodiments of the present invention, a guaranteed lifespan of a new material, the like, in which the new material is before mass production and is a lack of field data currently, may be provided and an effective design for increasing a lifespan of a material may be realized by utilizing the present invention.

Although exemplary embodiments of the present invention have been described and illustrated, those skilled in the art will appreciate that various alternations and modifications are possible without departing from the technical spirit of the present invention as disclosed in the appended claims.

What is claimed is:

1. A method of predicting a lifespan of a material, comprising:
    aging a specimen of the material by immersing the specimen of the material into an immersion solution and heating the immersion solution;
    measuring a material parameter of the material by measuring a physical property retention rate relative to an initial physical property of the specimen of the material of which the aging is completed;
    calculating an aging time by substituting the material parameter to Equation 1 that is described below, in which the aging time is when the physical property retention rate of the material becomes equal to or smaller than a reference value; and
    predicting the lifespan of the material as the aging time calculated by Equation 1, the material configured to be incorporated into a component of a vehicle such that a lifespan of the component is predicted according to the lifespan of the material, $$y = \gamma \times \exp\left[-\left(\frac{x}{\theta}\right)^\beta\right] \quad \text{[Equation 1]}$$

wherein in Equation 1, y is the physical property retention rate, x is the aging time, $\theta$ is a scale parameter, $\beta$ is a shape parameter, and $\gamma$ is the material parameter.

2. The method of claim 1, wherein a physical property measured in the measuring of the material parameter is tensile strength.

3. The method of claim 1, wherein the immersion solution used in the aging of the specimen of the material comprises an antifreeze fluid comprising any one of propylene glycol and ethylene glycol.

4. The method of claim 1, wherein the aging of the specimen of the material comprises aging the specimen of the material by immersing the specimen of the material into the immersion solution for about 24 hours to 72 hours and heating the immersion solution at a temperature of about 100° C. to 135° C.

* * * * *